June 8, 1965   F. C. OWEN   3,188,552
SATURABLE CORE WELDING TRANSFORMER
Filed Oct. 8, 1963

INVENTOR.
FREDERICK C. OWEN
BY Garvey & Garvey
ATTORNEYS

United States Patent Office 3,188,552
Patented June 8, 1965

3,188,552
SATURABLE CORE WELDING TRANSFORMER
Frederick C. Owen, 206 Fenton Place, Charlotte, N.C.
Filed Oct. 8, 1963, Ser. No. 314,696
3 Claims. (Cl. 323—43)

This invention relates broadly to welding transformers and more particularly to a welding transformer in which the output welding current is controlled by selected saturation of the core.

One of the objects of the present invention is to provide a construction of welding transformer in which the output A.C. welding current is varied by means of a D.C. current.

Another object of the present invention is to provide a construction of saturable core welding transformer which is simple in construction, economical to manufacture and provides the welder with a simple control means for selectively varying the output current within preset limits.

A further object of the invention is to provide a construction of semi-shell type welding transformer in which the output current is adjustable by means of a variable flux disposed in opposition to the main flux of the core.

Figure 1:
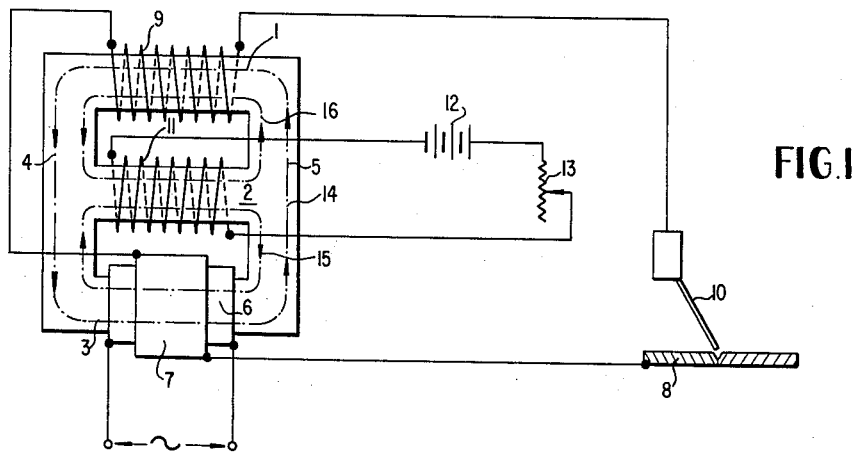
Figure 2:
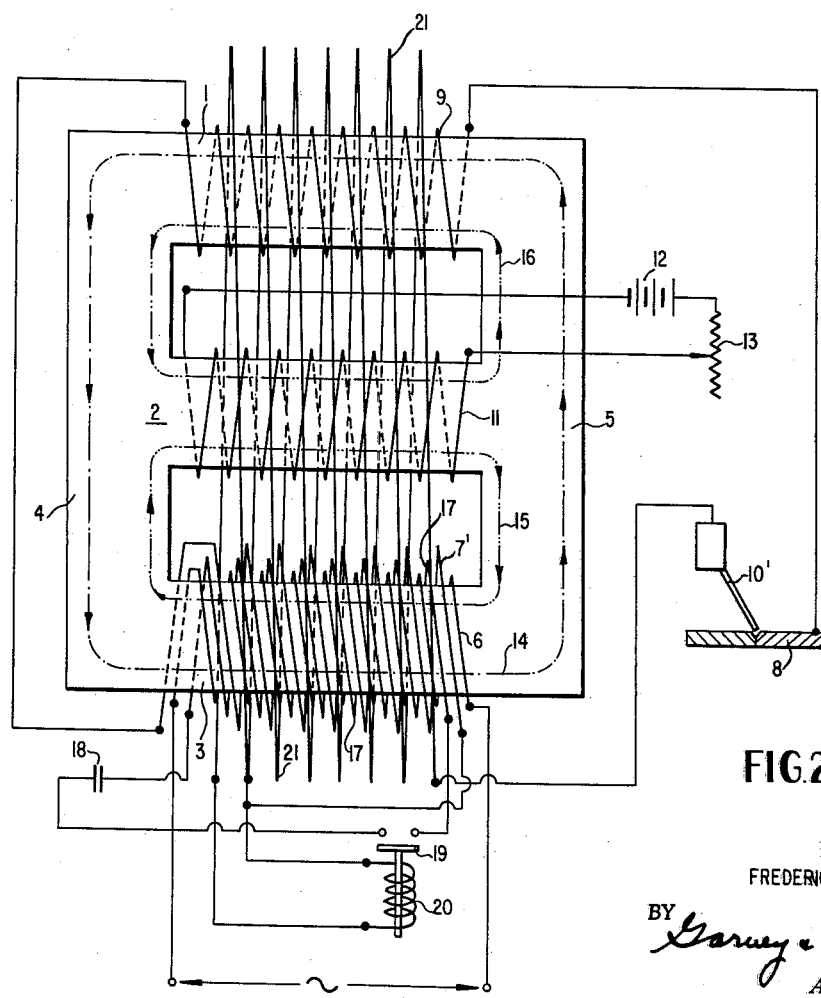

Other and further objects of the invention reside in the specific arrangement of the primary and secondary windings on the core relative to the variable control flux as set forth more fully in the specification hereinafter following, by reference to the accompanying drawings, in which:

FIGURE 1 is an electrical schematic diagram of a saturable core welding transformer constructed according to the teachings of the present invention; and FIGURE 2 is an electrical schematic diagram of a modified form of the transformer of FIGURE 1, and particularly showing a schematic representation of the various fluxes created in the transformer core.

Referring to the drawings in greater detail, and more specifically to FIGURE 1, the generally rectangular laminated core, constructed of paramagnetic material, is comprised of three parallel leg portions, namely, top leg portion 1, center leg portion 2 and bottom leg portion 3, joined at corresponding ends by side leg portions 4 and 5. A primary transformed winding 6 connected across a suitable A.C. power source is wound on bottom leg portion 3 with main secondary winding 7 also wound about bottom leg portion 3 on top of primary winding 6 so as to be concentrically disposed therewith. It is to be understood that either primary winding 6 or main secondary winding 7 may be the top winding.

One end of main secondary winding 7 is connected to the work 8 to be welded, while the other end is connected to auxiliary secondary winding 9 wound about top leg portion 1 of the transformer core. The opposite end of auxiliary secondary winding 9 is electrically connected to the consumable welding electrode 10, as shown.

A D.C. core saturation control winding 11 is wound about the center leg portion 2 of the core and is connected in series circuit with battery 12 and rheostat 13.

When primary winding 6 is energized by the A.C. source, it establishes an A.C. flux path indicated at 14 through bottom leg portion 3, side leg portion 5, top leg portion 1 and side leg portion 4 back to bottom leg portion 3. In addition, an A.C. flux path (not shown) is established through bottom leg portion 3, side leg portion 5, center leg portion 2 and side leg portion 4 back to bottom leg portion 3. In this condition of operation with only primary winding 6 energized, the maximum output welding current at electrode 10 is obtained as primary winding 6 is inductively coupled with main secondary winding 7 and the primary A.C. flux path 14 as well as a flux path developed by main secondary winding 7 are linked with the windings of auxiliary secondary winding 9. Thus the maximum output welding current obtainable from the transformer of the invention is designed into the machine at manufacture and is determined by the number of windings provided in the various primary and secondary windings.

When the control winding 11 is energized by a direct-current source such as battery 12, it establishes a direct-current flux through center leg portion 2, side leg portion 5, bottom leg portion 3 and side leg portion 4 back to center leg portion 2 as indicated at 15. It also establishes a direct-current flux 16 through center leg portion 2, side leg portion 5, top leg portion 1 and side leg portion 4 back to center leg portion 2. These fluxes 15 and 16 saturate the transformer core with direct-current flux 15 being opposite in direction to the A.C. flux 14, and direct-current flux 16 being induced in the same direction as A.C. flux 14.

The magnitude of the direct-current fluxes 15 and 16 is proportional to the current flow through D.C. saturation control winding 11, which in the circuit as shown, is proportional to the magnitude of series resistance added to the circuit by rheostat 13. As more resistance is added to the circuit by rheostat 13, the control winding current is varied from a maximum to a minimum which in turn varies the magnitude of the D.C. fluxes 15 and 16 to decrease the degree of saturation of the transformer core. As the degree of saturation of the core is decreased, the secondary output current available at welding electrode 10 is varied from a set minimum to a set maximum thus giving the welder positive control of the magnitude of the welding current desired merely by varying a rheostat dial, or the like.

The exact theory of operation is not known but it is believed that as the magnitude of direct-current flux 15 is increased, to increase the degree of saturation of the core, the effective reluctance of center leg portion 2, side leg portion 5, bottom leg portion 3 and side leg portion 4 is increased thus reducing the effective coupling between primary winding 6 and auxiliary secondary winding 9 since the increased reluctance of the core tends to decrease the magnitude of the A.C. flux path 14. As the effective coupling between primary winding 6 and auxiliary secondary winding 9 is diminished by increasing the flow of current through D.C. saturation control winding 11, the voltage induced in auxiliary secondary winding 9 from the primary and main secondary windings is decreased, raising the impedance of the transformer and decreasing the output current available for welding purposes. This manipulation in effect makes the device a poorer transformer and affects the voltage induced in both the main secondary winding 7 and auxiliary secondary winding 9 by the primary winding, but would appear to have greater effect upon the voltage induced in the auxiliary secondary winding.

By manipulating the rheostat 13 to insert more resistance in the control winding circuit, the current in that winding is decreased, thus lowering the degree of saturation in the core and increasing the current available at the output of the transformer secondary circuit for welding purposes.

A modified form of the transformer of the invention is shown in FIGURE 2 wherein for purposes of clear understanding similar components and flux paths corresponding to those shown in FIGURE 1 have been designated with reference numerals similar to those in FIGURE 1. The arrangements of saturation control winding 11 and its associated circuitry, and the primary winding 6 are the same as shown in FIGURE 1, but the secondary circuit is somewhat different. As in the first form of the welding transformer, main secondary winding 7' is wound concentric with, either above or below, primary winding 6 with one end thereof connected to one end of auxiliary secondary winding 9, wound on top leg portion 1. The opposite end of auxiliary secondary winding 9 is electrically connected with the work 8 to be welded. A condenser charging winding 17 is wound concentric with primary winding 6 and main secondary winding 7' with its ends connected in series circuit with a bank of condensers indicated generally at 18 and the contactor 19 of solenoid switch 20.

A third secondary winding 21 is wound about the perimeter of the transformer over auxiliary winding 9 and the concentrically wound primary, main secondary and condenser windings 6, 7' and 17 respectively. Secondary winding 21 is wound on the transformer core in the same direction as the main secondary winding and auxiliary secondary winding, and is connected in series aiding therewith, having one end connected to the opposite end of main secondary winding 7' and the other end connected to welding electrode 10' to complete the secondary welding circuit.

The third secondary winding 21 is provided with an additional turn or two beyond its point of connection with main secondary winding 7' and the coil of solenoid switch 20 is connected in parallel with the additional turn or turns. When the transformer is energized but inactive, that is, when saturation control winding 11 is energized by battery 12, and primary winding 6 is energized by a source of A.C. current, but the welding arc has not been struck, the open circuit voltage of the secondary circuit is relatively low but yet sufficient for a striking voltage to start the welding operation, thus eliminating the hazard to the operator of the presence of the normal high open circuit voltage present in most existing machines. When the secondary circuit is closed by striking the welding arc, solenoid switch 20 is energized moving contactor 19 to complete the series circuit between condensers 18 and condenser charging winding 17, thus placing the condenser charging winding in inductive relation with primary winding 6, main secondary winding 7' and the third secondary winding 21. The capacitors 18 charge to their maximum value and increase the magnetic flux linkage between the primary and secondary circuits increasing the magnitude of the output welding current, while at the same time correcting the transformer power factor. This arrangement thus gives the advantage of a low open circuit voltage machine while at the same time providing all of the advantages of high open circuit voltage welders. The condenser charging winding 17 operates in substantially the same manner as set forth in my Patent 2,365,722, issued December 26, 1944 for Transformer.

Primary winding 6 is inductively coupled with main secondary winding 7' and the third secondary winding 21 and in addition is linked with auxiliary secondary winding 9 by means of the magnetic A.C. flux path 14. As the D.C. current in saturation control winding 11 is varied from a minimum to a maximum by manipulation of rheostat 13, the degree of saturation of the transformer core is increased, as previously described, increasing the reluctance of the core and decreasing the effective coupling between the primary winding and the various secondary windings and the magnetic coupling between the various secondary windings themselves, and between the condenser charging winding 17 and the primary and various secondary windings due to the magnetic A.C. flux path 14 and other A.C. flux paths set up in the core to thus vary the output welding current from a maximum to a minimum. The addition of the condenser charging winding 17 and the third secondary winding 21 wound about the perimeter of the transformer and the other windings provide a greater range of control of the output welding current by manipulation of the rheostat 13 than that obtainable from the design shown in FIGURE 1.

While the invention has been shown and described in certain preferred embodiments, it is realized that modifications can be made without departing from the scope of the invention, and it is to be understood that no limitations upon the invention are intended other than those imposed by the scope of the appended claims.

What I claim as new and desire to secure by Letters Patent of the United States is as follows:

1. A welding transformer comprising, a magnetic core having at least three substantially parallel legs joined at respective ends, a primary winding carried by one of the two outer parallel legs of said core to produce an A.C. flux therethrough with a return path through the opposite outer parallel leg, a first secondary winding wound with said primary winding on said one of the two outer parallel legs, a second secondary winding carried by the other of the two outer parallel legs, a saturation control winding carried by the central parallel leg of said core to produce a variable D.C. flux in the same direction in the two outer parallel legs of said core for selective adjustment of the effective A.C. flux in said core, and a third secondary winding surrounding said primary and said first and second secondary windings and connected in series aiding with said first and second secondary windings to form a welding circuit.

2. A welding transformer as set forth in claim 1 including a charging winding concentrically wound with said primary and said first secondary windings, charge storage means, and switch means connected to said third secondary winding to connect said charge storage means across said charging winding when the welding circuit is completed.

3. A welding transformer comprising, a generally rectangular magnetic core having three parallel legs, a primary winding carried by one of the outer legs of said three parallel legs and adapted to produce an A.C. flux through the outer legs of said core, a D.C. saturation control winding carried by the central leg of said three parallel legs and adapted to produce a D.C. flux through said central leg and said one outer leg opposite to the A.C. flux and adapted to produce a D.C. flux through said central leg and the opposite outer leg in the same direction as the A.C. flux, a first secondary winding carried by said one outer leg with said primary winding, a second secondary winding carried by the opposite outer leg of said three parallel legs in a manner to be linked with a portion of the A.C. flux, a third secondary winding surrounding the perimeter of said core over said second secondary winding, and said primary and first secondary winding in a manner to be inductively coupled with each of said windings and a portion of the A.C. flux, and said first, second and third secondary windings connected in series to provide a welding circuit whereby the current of the welding circuit is adjustable by variance of the D.C. flux by said D.C. saturation control winding to vary the degree of core saturation.

References Cited by the Examiner

UNITED STATES PATENTS

| | | | |
|---|---|---|---|
| 1,724,935 | 8/29 | Huet | 336—184 X |
| 1,968,346 | 7/34 | Neiss | 323—56 X |
| 2,281,593 | 5/42 | Odessey | 323—56 |
| 2,777,986 | 1/57 | Bennett | 323—56 |
| 2,904,743 | 9/59 | McClain | 323—56 |
| 2,914,721 | 11/59 | Kohn | 323—48 X |

LLOYD McCOLLUM, *Primary Examiner.*